United States Patent
Horodezky et al.

(10) Patent No.: US 8,229,410 B2
(45) Date of Patent: Jul. 24, 2012

(54) METHODS FOR SUPPORTING MULTITASKING IN A MOBILE DEVICE

(75) Inventors: Samuel Jacob Horodezky, San Diego, CA (US); Gregory Heinzinger, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 901 days.

(21) Appl. No.: 12/164,665

(22) Filed: Jun. 30, 2008

(65) Prior Publication Data

US 2009/0325563 A1     Dec. 31, 2009

(51) Int. Cl.
  *H04M 3/00*   (2006.01)
  *G09G 1/14*   (2006.01)
  *G09G 5/00*   (2006.01)
  *G06F 3/02*   (2006.01)
  *G06F 3/048*  (2006.01)
  *G06F 3/14*   (2006.01)

(52) U.S. Cl. .......... 455/418; 345/24; 345/168; 345/169; 715/778; 715/783; 715/788; 715/810; 715/835; 715/864

(58) Field of Classification Search ............ 715/764, 715/767, 768, 778, 783, 784, 788, 790, 793, 715/794, 795, 796, 802, 810, 835, 845, 864; 345/24, 168, 169; 455/418, 550.1, 566
  See application file for complete search history.

(56) References Cited

U.S. PATENT DOCUMENTS

| | | | | |
|---|---|---|---|---|
| 7,139,850 | B2* | 11/2006 | Amemiya et al. | 710/48 |
| 7,376,442 | B2* | 5/2008 | Yoshioka | 455/556.2 |
| 7,395,082 | B2* | 7/2008 | Foster et al. | 455/550.1 |
| 7,614,010 | B2* | 11/2009 | Hosoki et al. | 715/783 |
| 7,706,786 | B2* | 4/2010 | Natsuno et al. | 455/418 |
| 2002/0173299 | A1 | 11/2002 | Buchholz et al. | |
| 2005/0164688 | A1 | 7/2005 | Satake | |
| 2007/0220445 | A1* | 9/2007 | Yach et al. | 715/790 |
| 2007/0238488 | A1* | 10/2007 | Scott | 455/566 |
| 2008/0081672 | A1* | 4/2008 | Miyamoto | 455/566 |
| 2008/0125179 | A1* | 5/2008 | Hamada et al. | 455/566 |
| 2009/0036108 | A1* | 2/2009 | Cho | 455/418 |

OTHER PUBLICATIONS

DELL Axim X3 User's Guide, Jan. 2004, especially pp. 35 & 36.*
International Search Report and Written Opinion—PCT/US2009/048210, International Search Authority—European Patent Office—Sep. 24, 2010.

* cited by examiner

*Primary Examiner* — Dwayne Bost
*Assistant Examiner* — Larry Sternbane
(74) *Attorney, Agent, or Firm* — James T. Hagler

(57) ABSTRACT

Methods are provided for effectively accessing and managing open applications on a mobile device. In response to an End key key-press event, an open application is terminated and another open application is promptly maximized. In an embodiment, another key may be pressed to access to an Applications Menu which indicates open applications. Open applications can be selected on the Applications Menu and selectively maximized or terminated. In an embodiment a key may be pressed to access an Open-Applications Menu which lists open applications. Open applications can be selected on the Open-Applications Menu and selectively maximized or terminated.

36 Claims, 6 Drawing Sheets

METHODS FOR SUPPORTING MULTITASKING IN A MOBILE DEVICE

FIELD OF THE INVENTION

The present invention relates generally to electronic devices and more particularly to user interface support for multitasking in a mobile device.

BACKGROUND

Usage of wireless mobile communication devices (mobile devices), such as cellular telephones, is ever increasing due to their portability and connectivity. At the same time, mobile devices are growing in sophistication, supporting many useful applications that can run simultaneously, becoming multipurpose productivity tools. As the number and complexity of applications available for mobile devices increase, they require more sophisticated user interface support. However, many of the currently available mobile devices have poorly implemented user interfaces and fail to properly support the use and management of multiple open applications.

SUMMARY

The various embodiment methods provide user interface support to help users manage multiple open applications executing on mobile devices. In an embodiment, users may manage multiple open applications using an Application Key which can provide users with easy access to a list of open applications.

In the various embodiments, the End key functionality is configurable to help users manage open applications. The End key may be configured to allow users to terminate an open application and maximize another open application. An applications menu indicating open applications and/or an open-applications menu may also be provided to permit users to further manage open applications.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
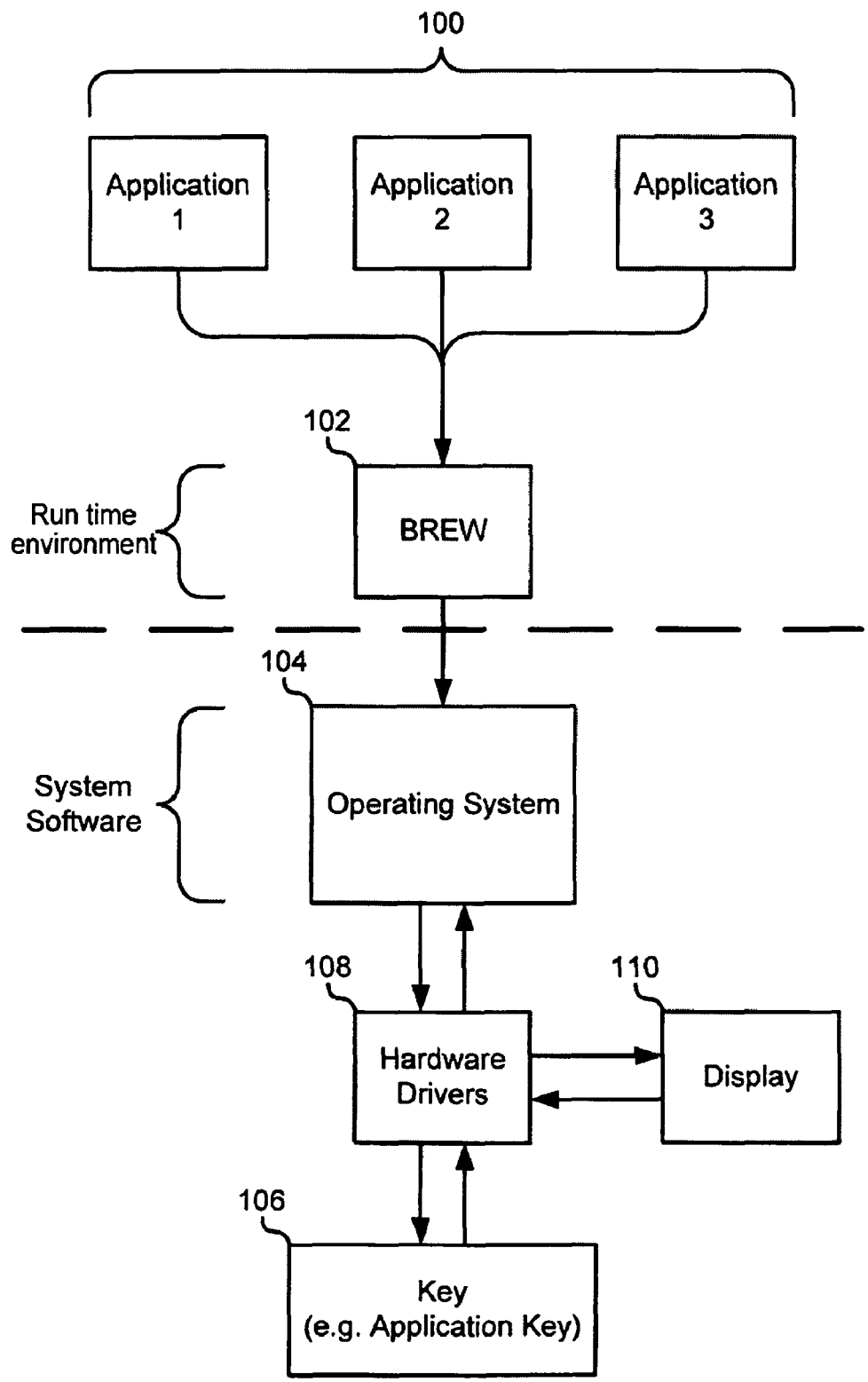
FIG. 1 is a software/hardware architecture diagram of a mobile device.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In this description, the terms "exemplary" is used herein to mean "serving as an example, instance, or illustration." Any implementation described herein as "exemplary" is not necessarily to be construed as preferred or advantageous over other implementations. The term "maximize" is used to mean to display an open application that is not currently visible on the mobile device display, and not necessarily to change the size or configuration of the display itself.

As used herein, the terms "mobile device", "mobile handset", "handset" and "handheld device" refer to any one or all of cellular telephones, personal digital assistants (PDAs) with wireless modems, wireless electronic mail receivers (e.g., the Blackberry® and Treo® devices), multimedia Internet enabled cellular telephones (e.g., the iPhone®), wireless telephone receivers and similar personal electronic devices. In a preferred embodiment, the mobile device is a cellular handset device (e.g., a cellphone). However, cellular telephone communication capability is not necessary as the various embodiments may be implemented on a computing device which implements a variety of text data entry methods.

The constant demand for enhancing the performance and functionality of mobile devices has made available an increased number of software applications for mobile devices. As the number and complexity of these mobile device applications increase, it is inevitable that the users open multiple applications at one time. Multitasking mobile devices allow users to do just that. Multitasking is a method by which multiple tasks, also known as processes or applications, share common processing resources such as a computer processing unit (CPU). In the case of a mobile device with a single CPU, only one task is said to be running at any point in time, meaning that the CPU is actively executing instructions for that task. Multitasking solves the problem by scheduling which task may be running at any given time, and when another waiting task gets a turn. Even on mobile devices with more than one CPU (called multiprocessor machines), multitasking allows many more tasks to run "concurrently" than there are CPUs.

After using an application, it is up to users to terminate the open application on their mobile devices. However, there are many reasons why the users may fail to terminate open applications on their mobile devices. For one, users may be distracted by other events, such as an incoming phone call or an incoming text message. Such distractions may be caused by interruptive events of mobile devices, particularly converged mobile devices. In converged mobile devices phone functionality is combined with PDA functionality allowing the users to open many different software applications, such as electronic mail, text and spreadsheet files, address books, maps, e-books, etc., all while making and receiving phone calls. Users while in the process of running an application on their mobile devices may be interrupted by phone calls. By answering the phone call, users cause the mobile device to pause open applications, essentially leaving the applications open and operating in the background, to enable phone functionality to receive the phone call. In many instances, users forget about the paused applications after the phone call is ended, leaving the applications open and running in the background.

Users may also leave applications open on their mobile devices while switching back and forth between applications. For example, in retrieving driving directions to an address, users may open address book and map applications simultaneously so they can copy an address from the address book and paste it in the map application. This multitasking capability makes it easy for users able to retrieve driving directions to locations in the address book. To enable such copying and pasting processes, users must have both applications open at the same time. However, once the desired driving directions are retrieved, users may then forget to properly terminate the address book or the map application or both.

Users may also choose to leave applications open on mobile devices. For example, when reading an e-book, users may desire to leave the e-book application open to prevent the loss of their place in the text.

Users may also fail to properly terminate an open application when they mistakenly believe that a prior action terminated or cancelled the application. This mistake may be caused by ambiguous user interface solutions. For example, in some applications pressing the "End" key on a traditional mobile device returns users to the Home screen but does not terminate the application. Users may also leave applications open because they do not understand the multifunctionality of their mobile devices or are indifferent to the state of applications on their mobile devices.

Users may also be misled into incorrectly believing that applications have been terminated by the traditional functionality of the End key and similar keys. Traditionally, the End key is assigned two functions: terminating the presently running application ("terminate application") and returning the display to the Home screen ("return to idle"). The Home screen is displayed when the mobile device is in the idle state displaying an idle screen including wallpaper and soft key function assignments. Applications that were open but running in the background remain so with no indication provided to users. Thus, users may believe that since the mobile device has returned to the Home screen and previously running applications have been terminated.

While the ability to maintain multiple applications open at one time may be beneficial, failure to properly terminate open applications may overtax mobile device memory and processor resources and slow performance as well a result. Open but in the background applications can also cause user confusion. For example, open applications may startle or confuse users when they attempt to re-open an application already open and running in the background. Users may initially forget why the application is already open and may have to spend time remembering the prior use of the application or resetting the state of the application when it is maximized for a different reason. Therefore, a more efficient and intuitive user interface is needed for managing open applications on multitasking mobile devices. The longer the time elapsed before users are reminded of a forgotten open application the greater is startling effect and the possibility that the forgotten application is no longer relevant. Consequently, it is useful to remind users of open applications at the earliest time practical.

The various embodiments provide user interface implementations which change the function of certain keys to more efficiently manage open applications and provide users with less confusing key functions. For one, the End key may be assigned the function of terminating applications, instead of its current dual function of terminating an application, and returning to the Home screen. In this embodiment when users press the End key to properly terminate a current application an open application running in the background is immediately maximized. When such an application is maximized its function screen is presented on the display and the application is reallocated processor resources to bring it out of a standby state or otherwise bring its operation into the foreground. Applications are maximized in response to End key press events in a priority order, an example of which is the inverse order in which applications were opened (i.e., last opened will be first maximized). When there are no other open applications, pressing the End key terminates the open application and displays the Home screen (i.e., returns the mobile device to idle). In another embodiment, pressing the End key can terminate the current application and return the display to the Home screen, even when multiple applications are open.

Various embodiments also provide mobile device user interface methods for effectively accessing and managing open applications. In an embodiment, the Applications Menu includes animation or other display features to indicate which of listed applications are presently open. An Applications Menu presents a list of available applications on a mobile device. Users can open an application by accessing the Applications Menu and selecting a desired application. An Applications Menu may be the main menu or another menus that allow users to select and open an application on the mobile device. In another embodiment, an Open-Applications Menu is provided as part of the user interface to allow users to manage open applications. The Open-Applications Menu presents a list of applications currently open, both those running in the foreground and those in standby or running in the background. From the Open-Applications Menu users can use standard menu selection methods and keys, such as a rocker switch or down arrow to scroll through the list and click on a selection. In this manner users can select one or more open applications to view (or maximize) or terminate. Using the Open-Applications Menu users to quickly terminate open applications, switch back to an open application or view a menu showing all open applications from which they can manage open applications. The Open-Applications Menu may also enable users to terminate all open applications with the press of a single key.

In one embodiment the Open-Applications Menu may be accessed from other menus, such as the Applications Menu (i.e., a menu listing applications available on the mobile device), the Home screen, or from another application. User interface solution embodiments also provide a one-touch key access to the Open-Applications Menu, as well as press-and-hold key access.

In the various embodiments, the one-touch solutions may be implemented using a new key, which is referred to herein as an Application Key. This Application Key may be a dedicated key on the mobile device keypad or a programmable key. The Applications Key can be configured to provide users with one-touch access to either the Applications Menu or the Open-Applications Menu. For example, the Applications Key can be configured to present users with the Applications Menu in response to a single press of the Application Key and with the Open-Applications Menu in response to a press-and-hold of the Application Key. As another example, the mobile device may be configured by software to display the Applications Menu when a user presses the Application Key regardless of the open applications.

Other user interface embodiments may utilize other keys on a standard keyboard to allow users to access the Applications Menu or the Open-Applications Menu. For example, a Menu key may be configured to respond to a single press event by presenting a menu of options and functions in the conventional manner, and configured to respond to a press-and-hold event by presenting the Open-Applications Menu. Other standard keys such as an Options soft key may also be used for accessing the Open-Applications Menu. For example, users may press the Options soft key to access a primary menu which includes an option entitled "Open-Applications Menu." By selecting the Open-Applications Menu item, the Open-Applications Menu is presented.

FIG. 1 illustrates a software/hardware architecture diagram that may be implemented on mobile devices in the various embodiments for allowing users to access and manage open applications in a multitasking environment. In such an environment, a user may open multiple Applications 100. Each of the Applications 100 may communicate with the system software 104 (e.g., the operating system) operating on a mobile device processor via a runtime environment 102, such as a Binary Runtime Environment for Wireless (BREW®). For example users may open Application 1 to play a game, Application 2 to enter and save phone numbers in the address book, and Application 3 to calculate a number using a calculator. Because a mobile device processor is only capable of actively processing one task at a time, only one of the Applications 100 may be given access to the processor resources at any given time. Other open Applications 100 will be in a pause or standby state. The system software 104 keeps track of the open applications and allows users to view a selected application by running it on the processor and maximizing it on the mobile device display 110. Every time the user opens a new application or selects to view an open application, the software system 104 begins processing that application and presents its display image on the mobile device display 110 while maintaining the other open applications in the background in a pause state. Open applications in the background may be maintained in a queue or priority based on the order in which they were opened.

In this example architecture, users can access and manage open applications by using keys 106 of the keypad. The press of a key 106, which is referred to herein as a "key press event," such as an Application Key, is communicated to a hardware driver 108 before being received by the software system 104. When the various embodiments are implemented within the system software layer 104 the system software can process the key press event and display the requested information on the mobile device display 110.

Figure 2:
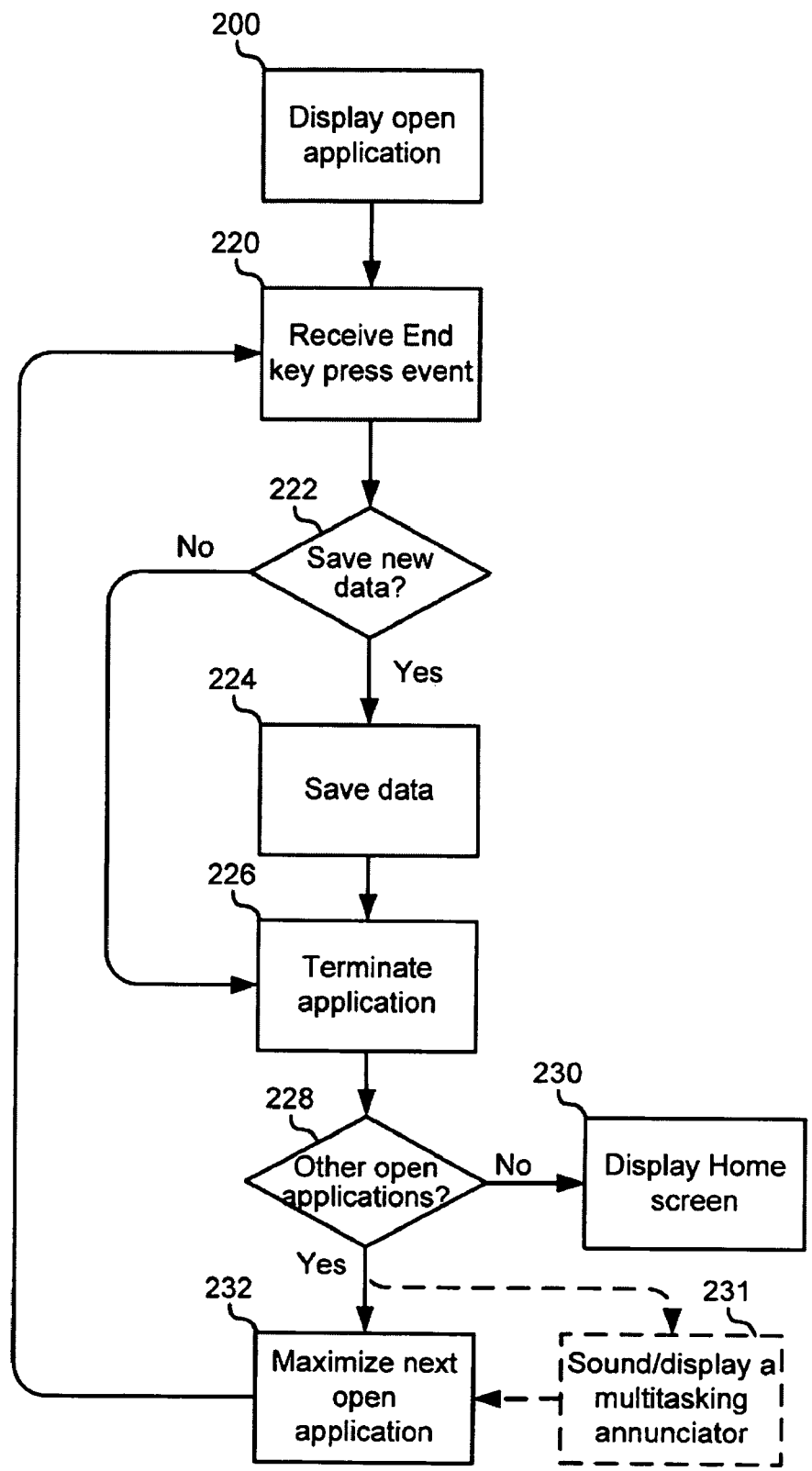
FIG. 2 is a process flow diagram illustrating steps of an embodiment using the End key.

FIG. 2 is a process flow diagram of an embodiment illustrating example steps that may be used to terminate an application and maximize another open application by pressing the End key. In this embodiment the functionality of the End key is modified from that of prior mobile devices, which terminate the application and return to idle, to instead terminate the application and maximize a selected one of other open applications. Accordingly, while an open application is operating on the mobile device, step 200, users may elect to terminate it by pressing the End key. The End key press event is received by the mobile device, step 220. In response, the mobile device processor begins the process of closing the application. The application may determine if there is data that should or could be saved, step 222. This determination may be automatic or it may present a user interface display to prompt users to indicate whether the new data should be saved. If the application determines that data should be saved or the user indicates in response to the prompt that the data should be saved (i.e., step 222="Yes"), the data is saved, step 224, and the application is terminated, step 226. If there is no data to be saved or the user indicates that the data should not be saved (i.e., step 222="No"), the application is terminated, step 226, without saving the data. Upon terminating the open application, the mobile device determines whether there are other open applications, step 228. If there are no other applications open on the mobile device (i.e., step 228="No"), the mobile device returns to idle and displays the Home screen on the display, step 230. If there are other open applications (i.e., step 228="Yes"), the next application in the queue from the open applications' list is maximized and shown on the mobile device display 110, step 232.

The order in which open applications are selected to be maximized may be maintained in a queue, a prioritized list, or stack of pointers according to a logic order. An example of one logic order is the inverse order in which applications were opened. Thus, the last application opened will be the first application maximized, and the first application opened will not be maximized until all other open applications have been maximized and terminated by a press of the End key. Other logic orders may assign priorities to certain applications such as to place priority on applications which are typically used more often. For example, an address book application may be given higher priority than a game application. Which ever method is used to assign the priority order, the system software keeps track of the order so that the next priority open application is maximized in response to a press of the End key.

Once an open application is maximized, step 232, that application continues to run until the user presses the End key, step 220. This prompts the steps described above to be repeated. Thus, a user may terminate every open application by simply pressing the End key each time an open application is maximized until there are no more open applications (i.e., step 228="No"). At that point the mobile device returns to the idle state, step 230.

By promptly maximizing an open application in response to the ending of an application by the press of the End key, this embodiment promptly informs the user that there are other open applications. Thus, the user is reminded of this fact and given an immediate opportunity to return to an open application. To help alert the user to this, embodiments may also use audio and/or visual indicators such as tones, animations and/or annunciators indicating that a multiprocessing session is in effect. For example, with the processor determines that there are other open applications (i.e., step 228="Yes"), the processor may optionally sound an audible multitasking annunciator, optional step 231, indicating that the processor is in a multitasking state. Such animation and/or audio annunciators may be initiated as part of the step of maximizing the next application, step 232, or may be a separate step.

Figure 3:
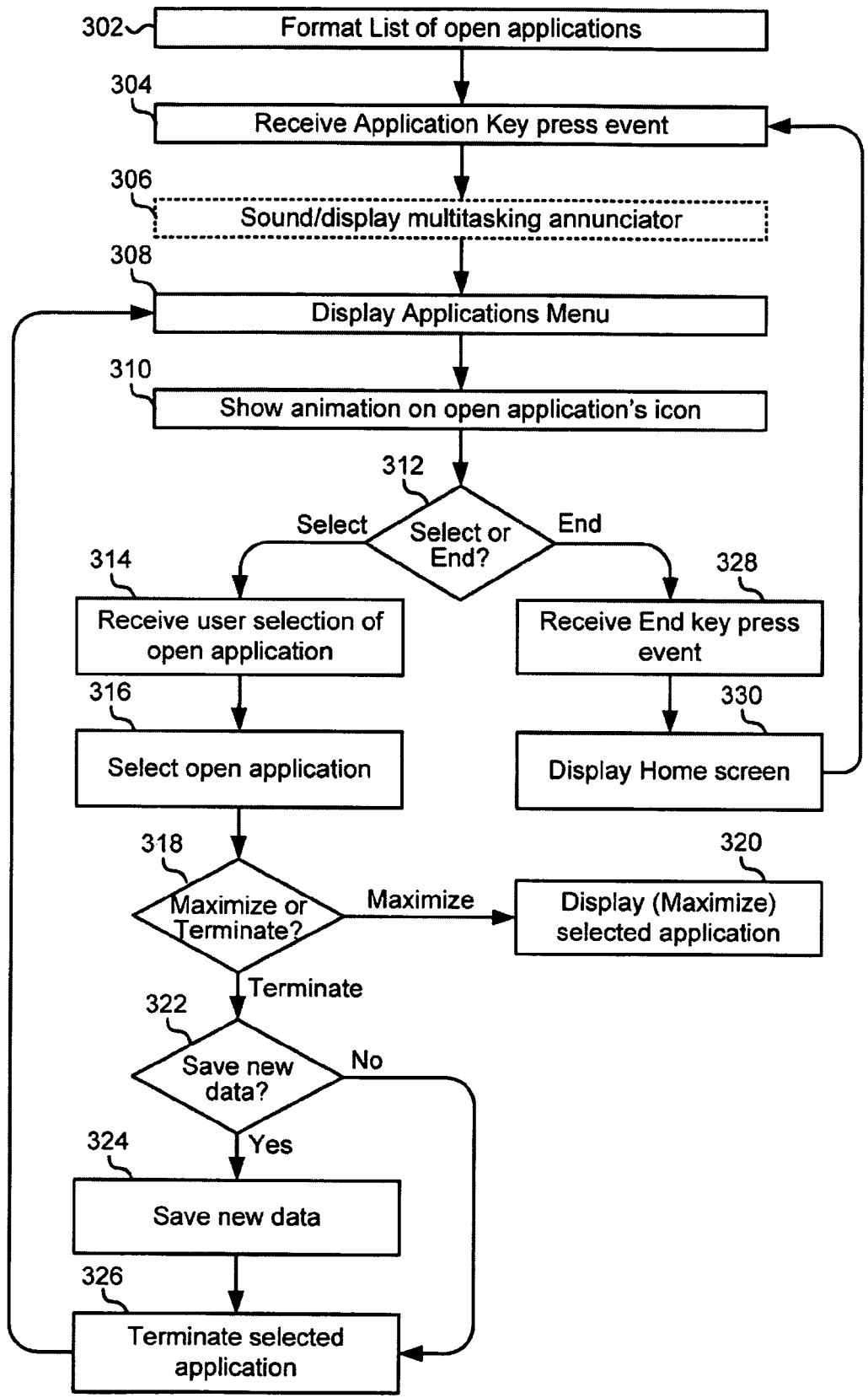
FIG. 3 is a process flow diagram illustrating steps of an embodiment method using an Application Key.

While the foregoing embodiment provides an intuitively efficient mechanism for managing multiple open embodiments in a multiprocessing environment, another embodiment provides users with further tools for managing open applications. FIG. 3 is a process flow diagram of an embodiment illustrating example steps that may be used to view and select open applications on a mobile device by a one-time press of the Application Key. This embodiment may be implemented in conjunction with the embodiment described above with reference to FIG. 2. Thus, when a user is informed that other applications are open by the maximizing of one of the applications, step 232, and/or a multitasking annunciator, optional step 231, the user may use this alternative embodiment to manage open applications without having to end each in succession. When users open applications on their mobile devices, the status of open applications is maintained by system software of the mobile device processor. As mentioned above, the system software may maintain the list in a priority order or otherwise rank the applications in an order for sequential maximizing. Using this information available in the system software, the mobile device processor can be configured by software to format an open applications list, step 302. The formatting of the open applications list may be accomplished every time an application is opened or terminated, or in response to an Application Key key-press event (i.e., after step 304). Users may access the Applications Menu by pressing the Application Key one time. For example, users may press the Application Key upon seeing an open application being maximized, step 232, or hearing a multitasking annunciator, optional step 231, in order to see which applications are open and otherwise manage open applications. The Application Key key-press event is received by the mobile device, step 304, and in response the Applications Menu is displayed, step 308. The Applications Menu lists the applications available on the mobile device and may display icons, such as animated icons, on, near or otherwise corresponding to open applications appearing on the list, step 310. Such open application icons allow users to easily identify the open applications in the Applications Menu. In an optional embodiment, the displaying of the Applications Menu may coincide with an audible multitasking annunciator, optional step 306, to alert users to the existence of open applications.

Once users have accessed the Applications Menu, the processor waits to receive user input, step 312. In an embodiment, such user input may be a selection of one of the open or not-open applications ("Select") or a press of the End key ("End"). Users can exit the Applications Menu by pressing the End key to return to the Home screen, such as to perform other tasks such like placing a phone call. If the End key is pressed while in the Applications Menu (i.e., step 312="End"), the mobile device receives the End key press event, step 328, and in response ends the Applications Menu session and displays the Home screen, step 330. Thus, this embodiment alters the functionality assigned to the End key from that described above with reference to FIG. 2 while the processor is running the Applications Menu. To return to the Applications Menu users can again press the Application Key to initiate steps 304 to 310 as described above.

Alternatively, users may select to maximize or terminate an open application by selecting it from the Applications Menu (i.e., step 312="Select"). Users may select an open application from the Applications Menu by using standard selection methods (such as arrow keys and a selection button) to highlight an application that is indicated to be open (e.g., by an animation icon). When users select an open application, their selection is received by the mobile device, step 314, and the open application is selected, step 316, on the display. The selection of an application can be conveyed to the user by any different known methods, such as for example, highlighting the selected item on the display. Once an open application is selected, users may be prompted to indicate whether the application should be maximized or terminates, step 318. If users elect to maximize an open application (i.e., step 320="Maximize") the mobile device maximizes the open application on the display. Alternatively, users may elect to terminate an open application without maximizing it (i.e., step 318="Terminate"). In an embodiment, users may also select several open applications to terminate by selecting more than on open application in step 316. When an open application is selected to be terminated, the application may determine whether there is any data that should be saved or prompt the user to indicate whether data should be saved, step 322. If the application determines that data should be saved or the user elects to save data (i.e., step 322="Yes"), data is saved, step 324, before the selected open application is terminated, step 326. If the user elects to terminate the application without saving data (i.e., step 322="No"), the open application is simply terminated, step 326. When an open application is terminated, the display may return to the Applications Menu, step 308, from which users can elect to go to the Home screen by pressing the End key, steps 312, 328 and 330, or select to maximize or terminate other open applications, steps 312 to 326.

Figure 4:
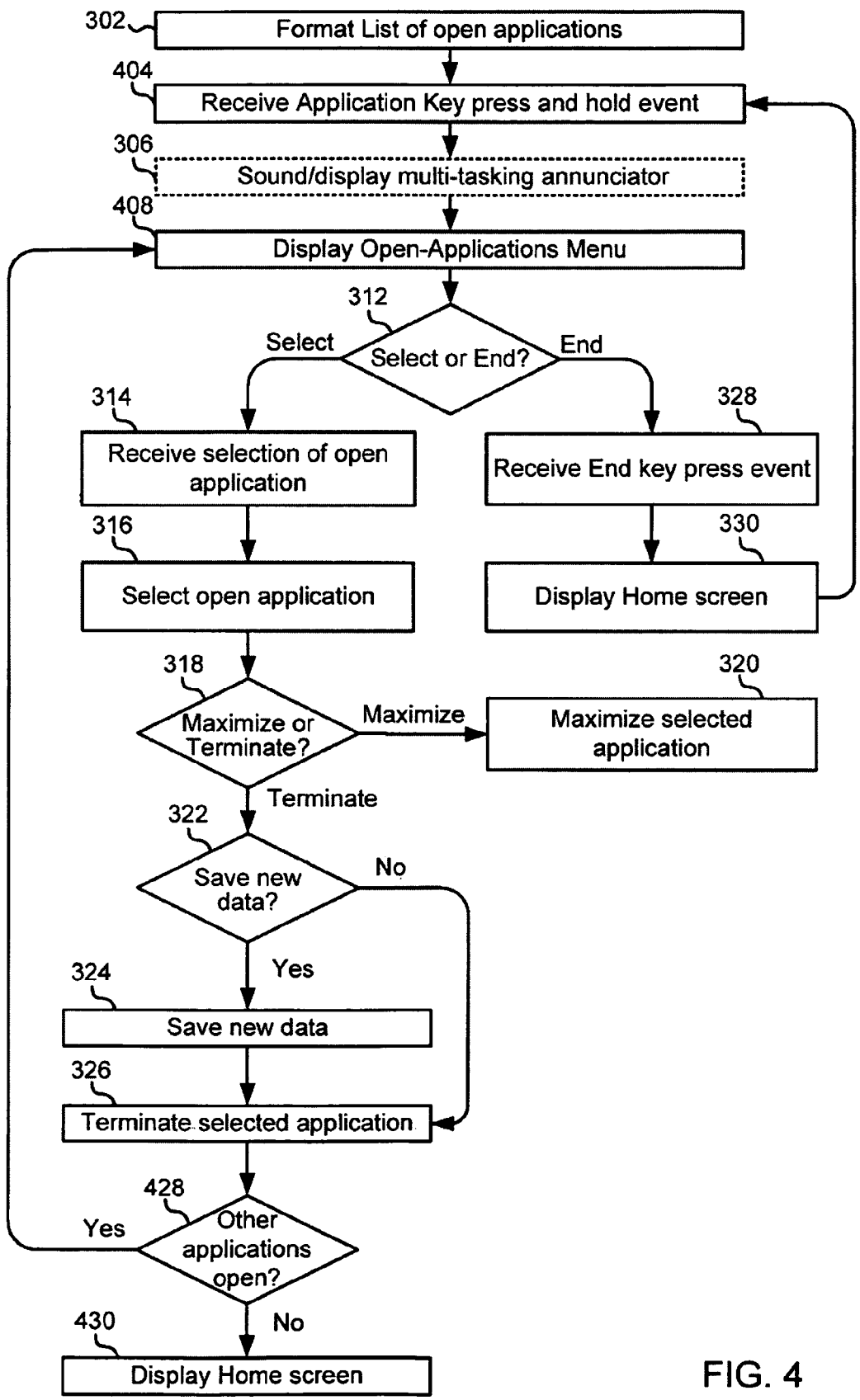
FIG. 4 is a process flow diagram illustrating steps of an embodiment using an Application Key.

FIG. 4 is a process flow diagram of an alternative embodiment illustrating example steps that may be used to select to maximize or terminate open applications on a mobile device via an Open-Applications Menu such as may be accessed by pressing and holding the Application Key. This embodiment may be implemented in conjunction with the embodiment described above with reference to FIG. 2. Thus, when a user is informed that other applications are open by the maximizing of one of the applications, step 232, and/or a multitasking annunciator, optional step 231, the user may use this alternative embodiment to manage open applications without having to end each application in succession. As discussed above with reference to FIG. 3, as users open applications on their mobile devices, the status of open applications is maintained by system software of the mobile device processor, which may be maintained in a prioritized list, step 302.

In the embodiment shown in FIG. 4, users may access an Open-Applications Menu by pressing and holding a particular key such as the Application Key. The Application Key key-press and hold event is received by the mobile device, step 404, which prompts the Open-Applications Menu to be displayed, step 408. In an optional embodiment, displaying the Open-Applications Menu may be accompanied by sounding of a multitasking annunciator, optional step 306. As mentioned above, the Open-Applications Menu lists only the applications currently open and enables users to select applications using standard user interface keys and methods. Similar to the embodiment described above with reference to FIG. 3, users can end the Open-Applications Menu session by pressing the End key which executes steps 312, 328 and 330 described above with reference to FIG. 3. Thus, this embodiment also alters the functionality assigned to the End key while the processor is running the Applications Menu from that described above with reference to FIG. 2. Users may also elect to maximize an open application by selecting to maximize a selected application which executes steps 312 to 320 described above with reference to FIG. 3.

Users may elect to terminate one or more selected open applications (i.e., step 318="Yes"). When terminating an open application, the application may determine whether there is any data that should be saved or prompt the user to indicate whether data should be saved, step 322. If the application determines that data should be saved or the user elects to save data (i.e., step 322="Yes"), data is saved, step 324, before the selected open application is terminated, step 326. If the user elects to terminate the application without saving data (i.e., step 322="No"), the open application is simply terminated, step 326. After terminating the selected open application(s), the processor determines whether there are other open applications, step 428. If there are other open applications (i.e., step 428="Yes"), the mobile device returns to display an updated Open-Applications Menu, step 408. This allows the user to access and manage other open applications. If there are no other open applications (i.e., step 428="No"), the mobile device returns to the Home screen, step 430.

As noted above, users may select more than one open applications from the Open-Applications Menu for termination (i.e., step 318="Terminate"). Each of the applications selected for termination may determine if data should be saved or prompt the user to select whether data from any one or all of the selected open applications should be stored, step 322. For example, if a user selects to terminate five open applications, the mobile device may prompt the user with five separate opportunities to indicate whether to save data for the corresponding open application. If the application(s) determine that data should be saved or user elections indicate that data should be saved (i.e., step 322="Yes"), the data is saved, step 324, and the corresponding application is terminated, step 326. If the application(s) determine that data should not be saved or user election indicate data should not be save (i.e., step 322="No"), the corresponding application is simply terminated, step 326. As discussed above, after terminating the selected open applications, the mobile device determines whether there are other open applications, step 428. If there are other open applications (i.e., step 428="Yes"), the mobile device returns to display an updated Open-Applications Menu, step 408. If there are no other open applications (i.e., step 428="No"), the mobile device returns to the Home screen, step 430.

Figure 5:
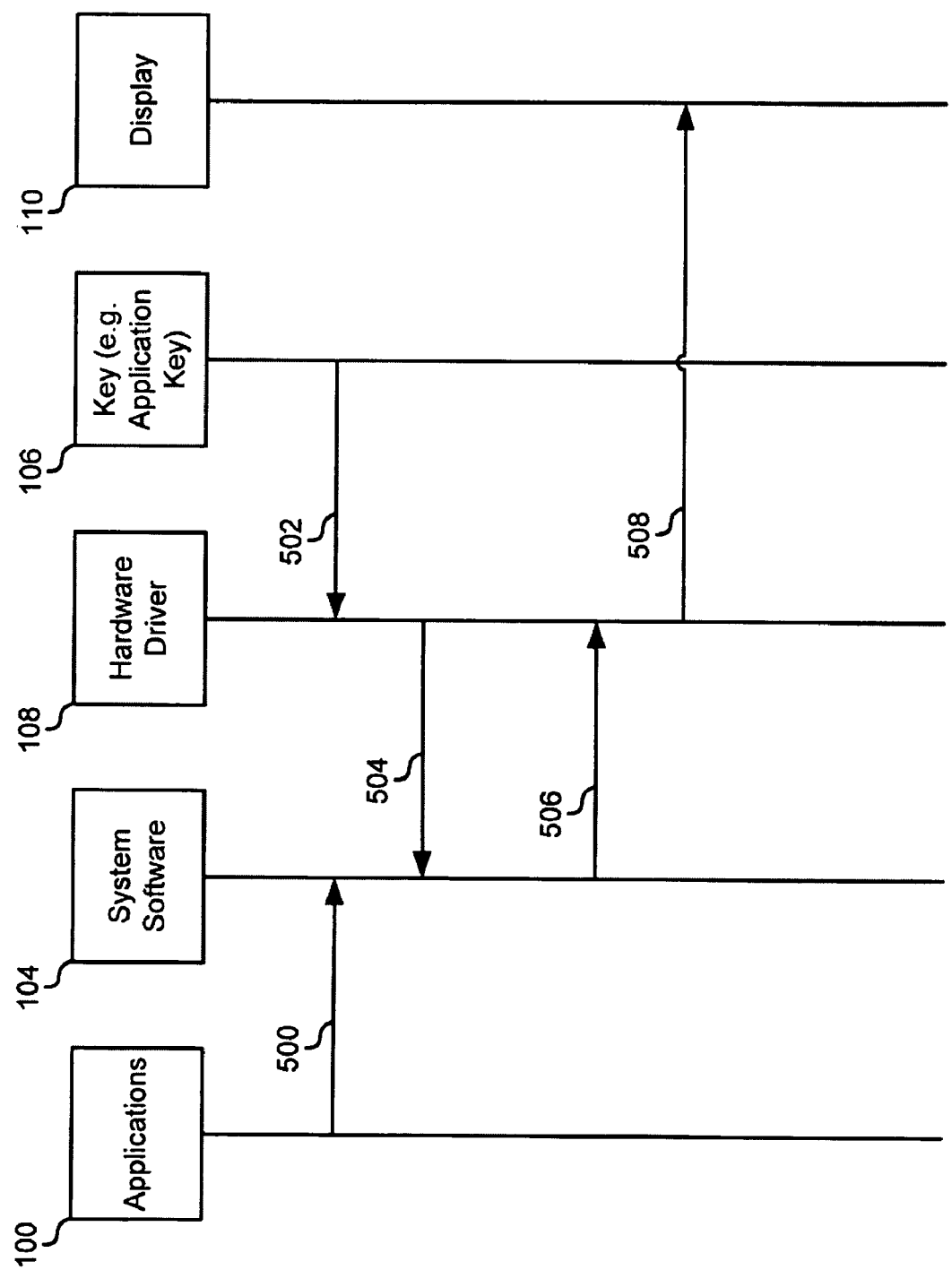
FIG. 5 is a message flow diagram associated with the process steps illustrated in FIGS. 2-4.

The example process steps illustrated in FIGS. 2-4 may be implemented in a number of electronic messages passed among the different hardware and software layers in the mobile device, such as illustrated in FIG. 5. Once an Application 100 is opened, it communicates with the system software 104, message step 500. As described above, the status of open applications are tracked by the system software 104 such as by maintaining an open applications list. Users can employ mobile device keys 106, such as the Application Key, to receive information about and manage the open applications on their mobile devices. Key press events of a key 106 is transmitted to a hardware driver 108, such as a keypad driver, message step 502, before it is received by the system software 104, message step 504. Upon receipt of the key press event, the system software 104 presents the requested information, such as the status of open applications, on the display 110. To do so, the requested information is sent by the system software 104 and received by a hardware driver 108, such as a display driver, message step 506, and then conveyed to the display 110, message step 508.

The foregoing method descriptions and the process flow diagrams are merely illustrative examples, and are not intended to require or imply that the steps of the various embodiments must be performed in the order presented. The steps in the foregoing embodiments may be performed in any order.

Figure 6:
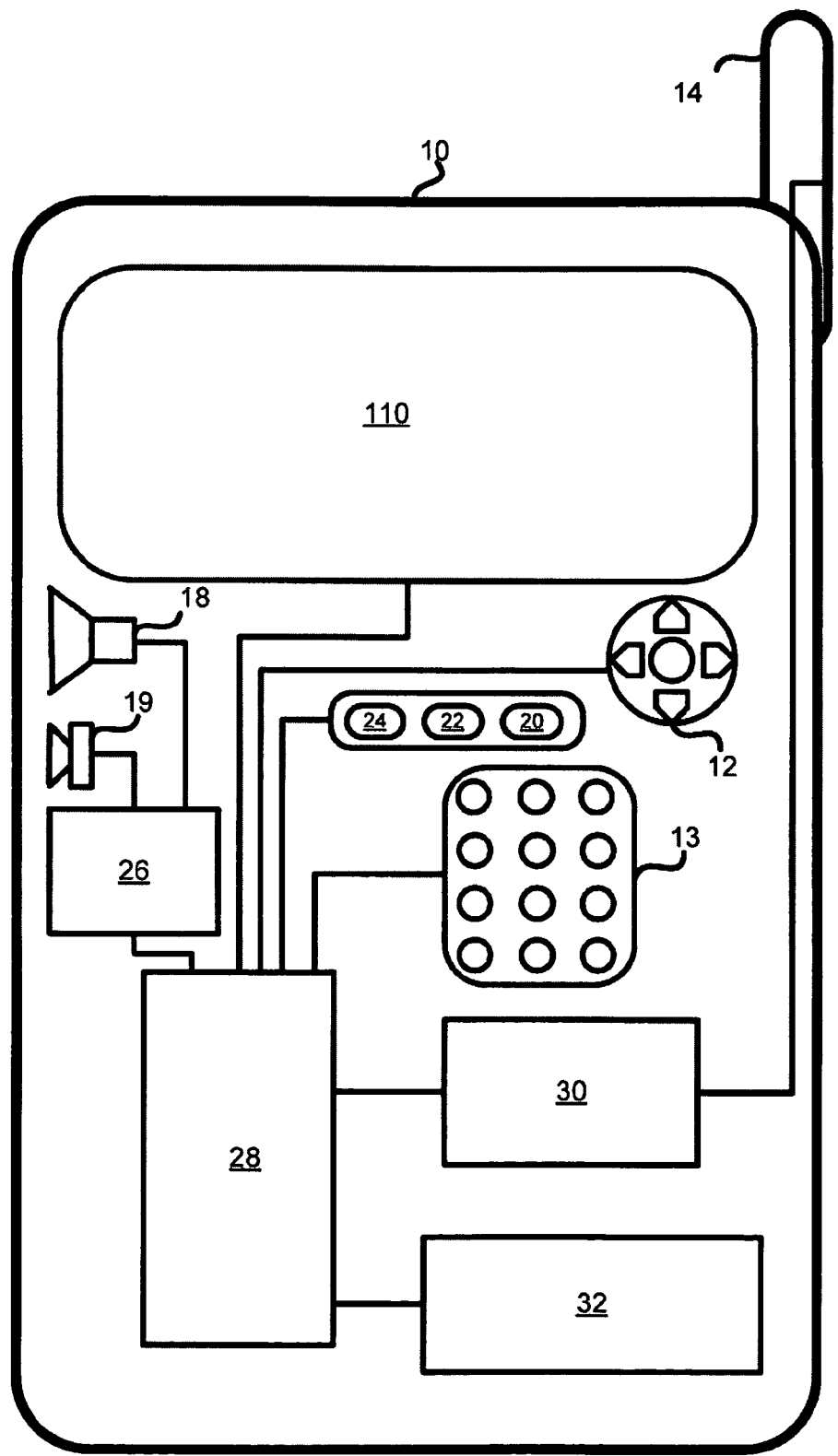
FIG. 6 is a system block diagram of a mobile device suitable for use in an embodiment.

The embodiments described above may be implemented on any of a variety of mobile devices, such as, for example, cellular telephones, personal data assistants (PDA) with cellular telephone, mobile electronic mail receivers, mobile web access devices, and other processor equipped devices that may be developed in the future. In addition, the embodiments described above may be implemented on any of a variety of computing devices, including but not limited to desktop and laptop computers. FIG. 6 depicts various components of a mobile device 10 capable of supporting the various embodiments disclosed herein. A typical mobile handset 10 includes a processor 28 coupled to internal memory 32 and a user interface display 110. The mobile handset 10 may include an antenna 14 for sending and receiving electromagnetic radiation that is connected to a wireless data link and/or cellular telephone transceiver 30 coupled to the processor 28. In some implementations, the transceiver 30, and portions of the processor 28 and memory 32 used for cellular telephone communications are referred to as the air interface since the combination provides a data interface via a wireless data link. Further, the mobile device 10 includes a speaker 18 to produce audible sound and a microphone 19 for sensing sound, such as receiving the speech of a user. Both the microphone 19 and speaker 18 may be connected to the processor 28 via a vocoder 26 which transforms analog electrical signals received from the microphone 19 into digital codes, and transform digital codes received from the processor 28 into analog electrical signals which the speaker 18 can transform into sound waves. In some implementations, the vocoder 26 may be included as part of the circuitry and programming of the processor 28.

The processor 28 may be any programmable microprocessor, microcomputer or multiple processor chip or chips that can be configured by software instructions (applications) to perform a variety of functions, including the functions of the various embodiments described above. In some mobile devices, multiple processors 28 may be provided, such as one processor dedicated to wireless communication functions and one processor dedicated to running other applications. Typically, software applications may be stored in the internal memory 32 before they are accessed and loaded into the processor 28. In some mobile devices, the processor 28 may include internal memory sufficient to store the application software instructions. For the purposes of this description, the term memory refers to all memory accessible by the processor 28, including internal memory 32 and memory within the processor 28 itself. The memory 32 may be volatile or nonvolatile memory, such as flash memory, or a mixture of both. Mobile handsets typically include a key pad 13, as well as other hard keys 20, 22, 24 and menu selection buttons or rocker switches 12 for receiving user inputs.

The various embodiments may be implemented by the processor 28 executing software instructions configured to implement one or more of the described methods. Such software instructions may be stored in memory 32 as the device's operating system software, a series of APIs implemented by the operating system, or as compiled software implementing an embodiment method. Further, the software instructions may be stored on any form of tangible processor-readable memory, including: a random access memory 32, a memory module plugged into the mobile device 10, such as an SD memory chip, an external memory chip such as a USB-connectable external memory (e.g., a "flash drive"), read only memory (such as an EEPROM); hard disc memory, a floppy disc, and/or a compact disc.

It is well known in the art that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A method for selecting an active application on a mobile device having a plurality of applications open in a multiprocessing environment, the mobile device having a keypad including an End key, comprising:
   recognizing a press of the End key while an application is running;
   terminating the running application in response to the press of the End key; maximizing one of the plurality of open applications immediately following termination of the running application;
   recognizing a second key press event;
   displaying an applications menu in response to the second key press event, the applications menu displaying a list of applications available on the mobile device including icons with indication of the listed applications that are open;
   receiving a user selection of one of the plurality of open applications;
   receiving a user input to maximize the selected one of the plurality of open applications; and
   maximizing the selected one of the plurality of open applications.

2. The method of claim 1, further comprising selecting one of the plurality of open applications to be maximized from a prioritized list of the open applications.

3. The method of claim 2, where in the prioritized list of the open applications prioritizes the open applications in an order inverse to that in which the open application were opened.

4. The method of claim 1, further comprising sounding an audible annunciator in conjunction with maximizing the one of the plurality of open applications 5. The method of claim 1, further comprising saving application data prior to terminating the running application.

6. The method of claim 1, wherein the second key press event is a press of an Application key.

7. A method for terminating applications on a mobile device having a plurality of applications open in a multiprocessing environment, the mobile device having a keypad including an End key, comprising:
   recognizing a press of the End key while an application is running;
   terminating the running application in response to the press of the End key;
   maximizing one of the plurality of open applications immediately following termination of the running application;
   recognizing a second key press event;
   displaying an applications menu in response to the second key press event, the applications menu displaying a list of applications available on the mobile device including icons with indications of the listed applications that are open;
   receiving a user selection of one or more of the plurality of open applications;
   receiving a user input to terminate the selected one or more of the plurality of open applications; and
   terminating the selected one or more of the plurality of open applications.

8. The method of claim 7, wherein the second key press event is a press of an Application key.

9. The method of claim 7, further comprising saving application data prior to terminating the selected one or more of the plurality of open applications.

10. A mobile device, comprising:
    a processor;
    a display coupled to the processor;
    a user interface keypad coupled to the processor, the keypad including an End key;
    a memory coupled to the processor;
    wherein the processor is configured with processor executable software instructions to perform steps comprising:
    recognizing a press of the End key while an application is running;
    terminating the running application in response to the press of the End key;
    maximizing one of a plurality of open applications immediately following termination of the running application;
    recognizing a second key press event;
    displaying an applications menu in response to the second key press event, the applications menu displaying a list of applications available on the mobile device including icons with indications of the listed applications that are open;
    receiving a user selection of one of the plurality of open applications;
    receiving a user input to maximize the selected one of the plurality of open applications; and
    maximizing the selected one of the plurality of open applications.

11. The mobile device of claim 10, wherein the processor is configured with processor software instructions to perform steps further comprising selecting one of the plurality of open applications to be maximized from a prioritized list of the open applications.

12. The mobile device of claim 11, where in the prioritized list of the open applications prioritizes the open applications in an order inverse to that in which the open application were opened.

13. The mobile device of claim 10, wherein the processor is configured with processor software instructions to perform steps further comprising sounding an audible multitasking annunciator in conjunction with maximizing the one of the plurality of open applications.

14. The mobile device of claim 10, wherein the processor is configured with processor software instructions to perform steps further comprising saving application data prior to terminating the running application.

15. The mobile device of claim 10, wherein the keypad includes an Application key and the second key press event is a press of the Application key.

16. A mobile device, comprising:
    a processor;
    a display coupled to the processor;

a user interface keypad coupled to the processor, the keypad including an End key;
a memory coupled to the processor;
wherein the processor is configured with processor executable software instructions to perform steps comprising:
recognizing a press of the End key while an application is running;
terminating the running application in response to the press of the End key;
maximizing one of a plurality of open applications immediately following termination of the running application;
recognizing a second key press event;
displaying an applications menu in response to the second key press event, the applications menu displaying a list of applications available on the mobile device including icons with indications of the listed applications that are open;
receiving a user selection of one or more of the plurality of open applications;
receiving a user input to terminate the selected one or more of the plurality of open applications; and
terminating the selected one or more of the plurality of open applications.

17. The mobile device of claim 16, wherein the keypad includes an Application key and the second key press event is a press of the Application key.

18. The mobile device of claim 17, wherein the processor is configured with processor software instructions to perform steps further comprising saving application data prior to terminating the selected one or more of the plurality of open applications.

19. A mobile device, comprising:
means for maintaining a plurality of open applications including one running application;
means for recognizing a press of an End key while the running application is running;
means for terminating the running application in response to recognizing the press of the End key;
means for maximizing one of the plurality of open applications immediately following termination of the running application;
means for recognizing a second key press event;
means for displaying an applications menu in response to the second key press event, the applications menu displaying a list of applications available on the mobile device including icons with indications of the listed applications that are open;
means for receiving a user selection of one of the plurality of open applications;
means for receiving a user input to maximize the selected one of the plurality of open applications; and
means for maximizing the selected one of the plurality of open applications.

20. The mobile device of claim 19, further comprising means for selecting one of the plurality of open applications to be maximized from a prioritized list of the open applications.

21. The mobile device of claim 20, further comprising means for prioritizing the open applications in an order inverse to that in which the open application were opened.

22. The mobile device of claim 19, further comprising means for sounding an audible annunciator in conjunction with maximizing the one of the plurality of open applications.

23. The mobile device of claim 19, further comprising means for saving application data prior to terminating the running application.

24. The mobile device of claim 20, wherein the second key press event is a press of an Application key.

25. A mobile device, comprising:
means for maintaining a plurality of open applications including one running application;
means for recognizing a press of an End key while the running application is running;
means for terminating the running application in response to recognizing the press of the End key;
means for maximizing one of the plurality of open applications immediately following termination of the running application;
means for recognizing a second key press event;
means for displaying an applications menu in response to the second key press event, the applications menu displaying a list of applications available on the mobile device including icons with indications of the listed applications that are open;
means for receiving a user selection of one or more of the plurality of open applications;
means for receiving a user input to terminate the selected one or more of the plurality of open applications; and
means for terminating the selected one or more of the plurality of open applications.

26. The mobile device of claim 25, wherein the second key press event is a press of an Application key.

27. The mobile device of claim 25, further comprising means for saving application data prior to terminating the selected one or more of the plurality of open applications.

28. A tangible processor-readable storage medium having stored thereon processor-executable software instructions configured to cause a processor to perform steps comprising:
recognizing a press of an End key while an application is running;
terminating the running application in response to the press of the End key;
maximizing one of a plurality of open applications immediately following termination of the running application;
recognizing a second key press event;
displaying an applications menu in response to the second key press event, the applications menu displaying a list of applications available on the mobile device including icons with indications of the listed applications that are open;
receiving a user selection of one of the plurality of open applications;
receiving a user input to maximize the selected one of the plurality of open applications; and
maximizing the selected one of the plurality of open applications.

29. The tangible processor-readable storage medium of claim 28 having stored thereon processor-executable software instructions configured to cause a processor to perform further steps comprising selecting one of the plurality of open applications to be maximized from a prioritized list of the open applications.

30. The tangible processor-readable storage medium of claim 29, wherein the prioritized list of the open applications prioritizes the open applications in an order inverse to that in which the open application were opened.

31. The tangible processor-readable storage medium of claim 28 having stored thereon processor-executable software instructions configured to cause a processor to perform further steps comprising sounding an audible multitasking annunciator in conjunction with maximizing the one of the plurality of open applications.

32. The tangible processor-readable storage medium of claim 28 having stored thereon processor-executable software instructions configured to cause a processor to perform further steps comprising saving application data prior to terminating the running application.

33. The tangible processor-readable storage medium of claim 28, the second key press event is a press of an Application key.

34. A tangible processor-readable storage medium having stored thereon processor-executable software instructions configured to cause a processor to perform steps comprising:
   recognizing a press of an End key while an application is running;
   terminating the running application in response to the press of the End key;
   maximizing one of a plurality of open applications immediately following termination of the running application;
   recognizing a second key press event;
   displaying an applications menu in response to the second key press event, the applications menu displaying a list of applications available on the mobile device including icons with indications of the listed applications that are open;
   receiving a user selection of one or more of the plurality of open applications;
   receiving a user input to terminate the selected one or more of the plurality of open applications; and
   terminating the selected one or more of the plurality of open applications.

35. The tangible processor-readable storage medium of claim 34, wherein the second key press event is a press of an Application key.

36. The tangible processor-readable storage medium of claim 34 having stored thereon processor-executable software instructions configured to cause a processor to perform further steps comprising saving application data prior to terminating the selected one or more of the plurality of open applications.

\* \* \* \* \*